(12) United States Patent
No et al.

(10) Patent No.: US 8,082,122 B2
(45) Date of Patent: Dec. 20, 2011

(54) MOBILE DEVICE HAVING A MOTION DETECTOR

(75) Inventors: Hyung Moon No, Cupertino, CA (US); Zhikai Tang, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 11/749,681

(22) Filed: May 16, 2007

(65) Prior Publication Data

US 2008/0140338 A1 Jun. 12, 2008

Related U.S. Application Data

(60) Provisional application No. 60/869,693, filed on Dec. 12, 2006.

(51) Int. Cl.
*G01C 22/00* (2006.01)
*G01B 21/16* (2006.01)
*G01B 5/02* (2006.01)
*G06F 11/00* (2006.01)

(52) U.S. Cl. ......... 702/160; 702/155; 702/157; 702/188

(58) Field of Classification Search .................. 702/103, 702/127–129, 131, 141, 160, 182, 183; 128/920; 600/300, 301, 485; 705/3
See application file for complete search history.

(56) References Cited

U.S. PATENT DOCUMENTS

| | | | |
|---|---|---|---|
| 6,030,342 A * | 2/2000 | Amano et al. | 600/301 |
| 6,790,178 B1 * | 9/2004 | Mault et al. | 600/300 |
| 7,242,306 B2 * | 7/2007 | Wildman et al. | 340/573.1 |
| 7,423,580 B2 * | 9/2008 | Markhovsky et al. | 342/126 |
| 7,463,997 B2 * | 12/2008 | Pasolini et al. | 702/160 |
| 7,468,036 B1 * | 12/2008 | Rulkov et al. | 600/485 |
| 2006/0073807 A1 | 4/2006 | Baker | |
| 2006/0087325 A1 | 4/2006 | Ariav et al. | |
| 2006/0189360 A1 | 8/2006 | White | |
| 2006/0199997 A1 | 9/2006 | Hassler, Jr. et al. | |
| 2006/0273885 A1 | 12/2006 | Thompson | |

* cited by examiner

*Primary Examiner* — Hal Wachsman
*Assistant Examiner* — Felix Suarez

(57) ABSTRACT

A system and method for detecting motion by a mobile device is provided. The mobile device determines whether motion is detected by a motion detector. The motion detection is sampled at a first sampling rate when no motion is detected for a specified time. The motion detection is sampled at a second sampling rate when motion is detected, wherein the second sampling rate is more frequent than the first sampling rate.

23 Claims, 5 Drawing Sheets

MOBILE DEVICE HAVING A MOTION DETECTOR

CROSS-REFERENCE TO RELATED APPLICATIONS

This application claims priority to U.S. Provisional Patent Application No. 60/869,693, entitled "Mobile Phone Pedometer Dual Sampling Mechanism", filed on Dec. 12, 2006, by Hyung Moon No, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices provide users with capabilities such as telecommunication, productivity, and gaming. Mobile devices may include mobile and/or wireless phones or communication systems, mobile handsets, mobile computers, personal digital assistants (PDAs), and handheld gaming devices, for example. Motion detectors are used to detect motion. Devices, such as pedometers, include motion detectors to detect movement or motion by a user of the device. A mobile device may include a pedometer application and a motion detector to enable the user of the mobile device to track, for example, the number of steps or distance traveled by the user over a period of time.

SUMMARY

In one embodiment, a mobile device for detecting motion is provided. The mobile device includes a motion detector and a pedometer application. The pedometer application samples for motion at a first sampling rate when no motion is detected for a specified time, and samples for motion at a second sampling rate when motion is detected, wherein the second sampling rate is more frequent than the first sampling rate.

In another embodiment, a method for detecting motion by a mobile device is provided. The mobile device determines whether motion is detected by a motion detector. The motion detector is sampled at a first sampling rate when no motion is detected for a specified time. The motion detector is sampled at a second sampling rate when motion is detected, wherein the second sampling rate is more frequent than the first sampling rate.

In yet another embodiment, a mobile device for detecting motion is provided. The mobile device includes a motion detector, a processor, and an application having instructions. When the processor executes the instructions, the application samples the motion detector at a first sampling rate when no motion is detected for a specified time, and samples the motion detector at a second sampling rate when motion is detected, wherein the second sampling rate is more frequent than the first sampling rate.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF THE PREFERRED EMBODIMENTS

Figure 1:
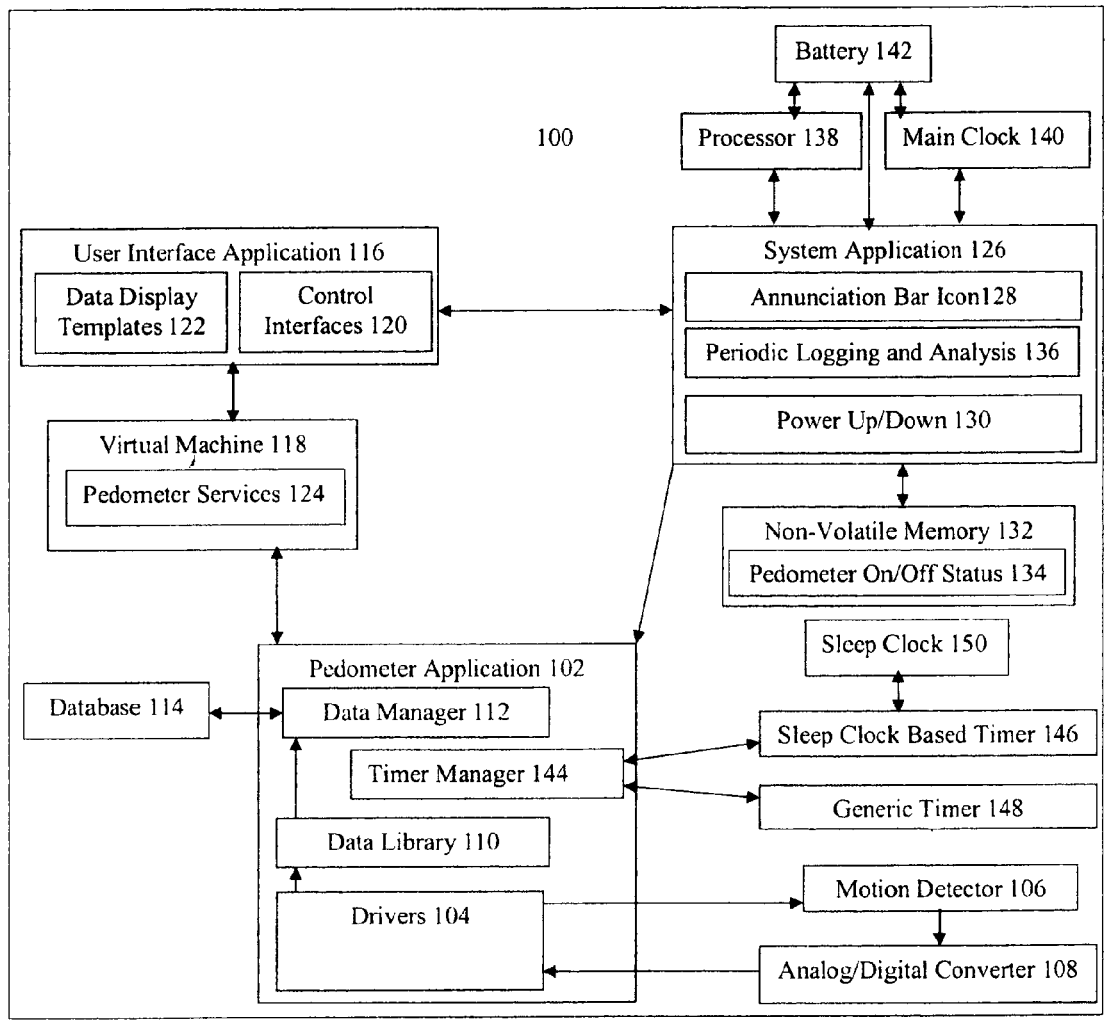
FIG. 1 shows a mobile device having a motion detector according to an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Systems such as motion detectors or pedometers may strain the resources of the mobile device upon which they are fitted. For example, mobile devices generally use batteries which have a limited supply of power, and the mobile devices have limited processing power. Unnecessarily waking a mobile device to process pedometer data when the mobile device is in a power-conserving sleep mode is a waste of resources. Adding another processor to a mobile device for the purpose of processing pedometer data may make the mobile device more expensive.

Pedometer applications may frequently sample the motion detector to capture any movement, such as steps, taken by the user of the mobile device. Frequently sampling the motion detector drains the battery and reduces the processing capabilities of the mobile device. Because of this strain, the battery cannot provide power for the mobile device without more frequent recharges or replacements. Furthermore, much of the time when the pedometer application is sampling the motion detector, the user is neither walking nor running. However, if the pedometer application does not frequently sample the motion detector, the accuracy of the pedometer diminishes and the user's steps or movement may go undetected.

Users may turn off the pedometer to extend battery life or make additional processing power available. However, the user may forget to turn the pedometer application back on, in which case user movement, such as walking, might not be recorded. The user might also accidentally leave the pedometer application on, which wastes processing power and further drains the battery.

The present disclosure provides systems and methods for sampling the motion detector at different rates to conserve power on the mobile device. In some embodiments, when no motion is detected for a specified time, such as a minute, it can be inferred that the user of the mobile device is not currently walking or running, so a lower sampling rate is used. The lower sampling rate conserves power which extends battery life. The lower sampling rate also requires less processing which frees the processor for work on other applications. The lower sampling rate checks for motion frequently enough to determine when user movement is again detected, such as when the user begins to walk or run again. Once motion is detected, the present system begins sampling for motion at a higher rate for improved accuracy.

The higher or more frequent sampling rate is frequent enough to insure a high degree of accuracy for data collected by the motion detector, but still infrequent enough to permit power consuming components on the mobile device to enter sleep mode to conserve power. Because many mobile devices already have a sleep clock that regulates activity when other power consuming components are deactivated, or put into sleep mode, the more frequent sampling rate can be triggered by a sleep clock-based timer without the need for adding more hardware to the mobile device. Whenever the motion data indicates that the user is no longer walking or running, the mobile device can switch back to the slower sampling rate.

Additionally, in some embodiments a processor on the mobile device processes motion detector data at a frequent processing rate to update a user interface when it is currently being viewed by the user. When the user is not interacting with the user interface, the processor can process motion detector data at a less frequent processing rate that is sufficient to store motion detector data for subsequent use. The less frequent processing rate can conserve power and processing resources.

The mobile device can use the motion detector for a pedometer application and/or a game application. For purposes of clarity and brevity, the present disclosure will be described in an embodiment where the motion detector is used for a pedometer. However, in other embodiments, motion detectors and applications may be implemented for other purposes, such as a motion detector for playing games on the mobile device.

FIG. 1 depicts a mobile device 100 having a motion detector according to an embodiment of the present disclosure. In the present embodiment the mobile device 100 is a mobile handset, such as a mobile phone, but could be other devices in other embodiments. The mobile device 100 is also described in more detail below with reference to FIGS. 4-6. The mobile device 100 includes a pedometer application 102 that includes drivers 104. The drivers 104 regulate the operation of a motion detector 106 and an analog/digital converter 108.

The motion detector 106 can be an accelerometer or other device for detecting or measuring acceleration or movement. An accelerometer can measure acceleration, detect and measure vibrations, or measure acceleration due to gravity, or inclination.

The motion detector 106 sends an analog signal to the analog/digital converter 108. The analog/digital converter 108 converts the analog signal to a digital signal and conveys the digital signal to the drivers 104. The drivers 104 convey the digital signal to a data library 110, which stores the motion data. The pedometer application 102, such as a data manager 112, may convert the digital signal to usable data such as step distance or other information. The data manager 112 can store the converted and computed data in a database 114. Also, the data manager 112 may use prior motion or step data to determine or interpret current motion data.

The mobile device 100 also includes a user interface application 116, which can run on a virtual machine 118. The user interface application 116 displays control interfaces 120 to the user of the mobile device 100, whereby the user can make various selections, such as to turn the pedometer application 102 on or off, or to request pedometer data for display on data display templates 122. The data display templates 122 are interfaces to receive and promote displaying data, such as will be described in greater detail with reference to FIGS. 2A and 2B. When the user requests data for display on the data display templates 122, the user interface application 116 retrieves the requested data from pedometer services 124 that run on the virtual machine 118. The pedometer services 124 request the data from the data manager 112 and convert, manipulate, and present the data in user-friendly forms. The user-friendly forms can include steps, miles, kilometers, and calories burned. The virtual machine 118 and its pedometer services 124 are required only when a system implementation is written in a language that runs on a virtual machine. Otherwise, the pedometer application 102 and the user interface application 116 can communicate with each other without the virtual machine 118.

The pedometer application 102 is configured such that the user interface application 116 does not need to be active for the pedometer application 102 to function. A system application 126 can interact with the pedometer application 102 to collect motion data on an as-needed basis. The system application 126 may include user interfaces and/or applications typically found on the mobile device 100 for operating the mobile device 100. The system application 126 includes an annunciation bar icon 128 that displays icons to the display of the mobile device 100 that inform the user of the status of various applications that continue to run in the background. For example, if the pedometer application 102 is running in the background, the annunciation bar icon 128 can display an icon of a runner in the system application 126 to inform the user of the mobile device 100 that the pedometer application 102 is active and collecting pedometer data.

The system application 126 includes a power up/down 130 selection by which the user can select to power up the mobile device 100 and power down the mobile device 100. When the mobile device 100 is powered up, the system application 126 checks non-volatile memory 132 to determine a pedometer on/off status 134. If the pedometer on/off status 134 indicates that the pedometer application 102 was set to on when the mobile device 100 was most recently powered down, the system application 126 turns on the pedometer application 102 when the mobile device 100 is turned back on. Additionally, the user of the mobile device 100 can enter inputs through the control interfaces 120 to turn the pedometer application 102 either on or off.

Additionally, the system application 126 includes periodic logging and analysis 136, which can communicate with a processor 138, a main clock 140, and the pedometer application 102 as needed. When the user of the mobile device 100 is not actively using any applications on the mobile device 100 and the mobile device 100 is not engaged, for example, in telecommunications related activity, the system application 126 can instruct the processor 138 and the main clock 140 on the mobile device to enter into sleep mode. When the processor 138 and the main clock 140 are in sleep mode, these and related power-consuming components on the mobile device do not consume as much power from a battery 142 on the mobile device 100. This sleep mode extends the length of time that the battery 142 can power the mobile device 100 without requiring recharge or replacement of the battery 142.

However, while the processor 138 and the main clock 140 on the mobile device 100 are in sleep mode, the user of the mobile device 100 may still want the pedometer application 102 on the mobile device 100 to collect pedometer data. The periodic logging and analysis 136 communicates with a timer manager 144 on the pedometer application 102, whereby the timer manager 144 selects between a sleep clock-based timer 146 and a generic timer 148 to operate the pedometer application 102. The sleep clock-based timer 146 is a timer that is based on a sleep clock 150, which continues to run even when the processor 138 and the main clock 140 are in sleep mode. The sleep clock-based timer 146 can activate the processor 138 and the main clock 140 from sleep mode to perform needed tasks, such as the sampling of data from the motion detector 106.

If the motion detector 106 has not detected motion for a specified time, such as one minute, the timer manager 144 selects the generic timer 148 for operation of the pedometer application 102. The generic timer 148 can trigger the pedometer application 102 to sample data from the motion detector 106 periodically, such as once every second, to determine if motion is detected. The lower sampling rate conserves the battery while still capturing user movement. If motion is detected, the timer manager 144 selects the sleep clock-based timer 146. The sleep clock-based timer 146 triggers the pedometer application 102 to sample the motion detector 106 more frequently, such as sixteen times every second, to collect pedometer data. The higher rate of sampling produces more accurate results. If the collected pedometer data indicates no motion for a specified time, such as one minute, the timer manager 144 selects the generic time 148 to return to the reduced, or lower, sampling rate. Although described as sampling the motion detector 106 or sampling data from the motion detector 106, the data may actually be sampled from the data library 110 that is supplied with data by the motion detector 106. It should be appreciated that there may not be an actual component or system that detects "no motion", and that determining that there is no motion may be deduced in various manners, such as by analysis of collected pedometer data suggesting or indicating that the device is not in motion.

When the user is using the mobile device 100, such that the processor 138 and the main clock 140 on the mobile device 100 are not in sleep mode, the pedometer application 102 can still have the option to sample data based on the higher sampling rate or the lower sampling rate. If motion data indicates that the mobile device 100 is moving, the higher sampling rate is required to produce accurate results. If motion data indicates that the mobile device 100 is not moving, the lower sampling rate conserves the battery and enables the mobile device 100 to allocate more processing resources to other activities.

Figure 2:
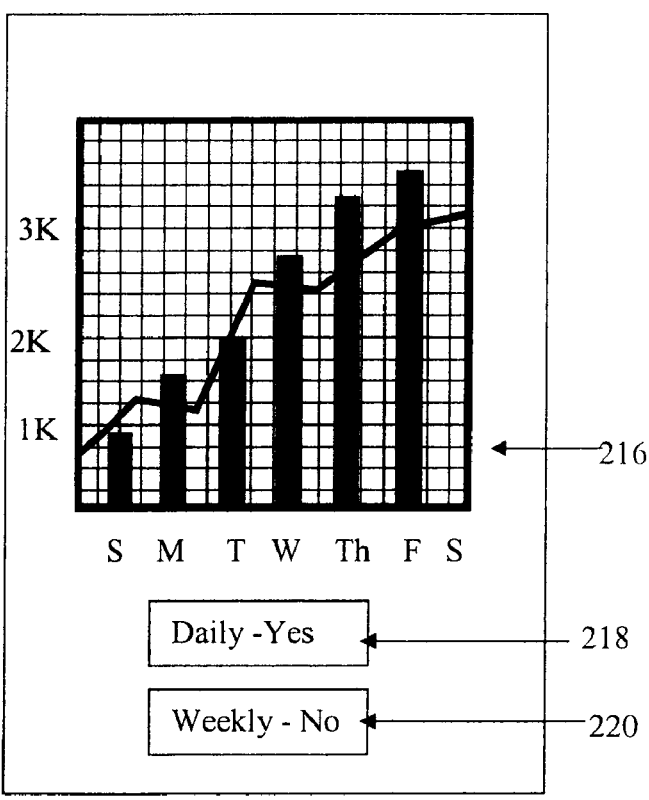
FIGS. 2A and 2B illustrate exemplary user interfaces for the mobile device and motion detector according to an embodiment of the present disclosure.

Turning now to FIG. 2A and FIG. 2B, block diagrams of user interfaces for a mobile device having a motion detector are depicted according to embodiments of the present disclosure. FIG. 2A depicts a user interface that displays requested pedometer data to the user of the mobile device 100. The user of the mobile device 100 can request pedometer data for a specific period of time, such as data for "week 15" 202. The data for "week 15" 202 includes rows for days of the week listed under day 204, and data for steps 206, data for miles 208, and data for thousands of calories burned, or KCal 210. The user interface can display cumulative data, such as total 212, which indicates that the user logged 69,076 steps during week 15, and calculated data, such as Ave. 214, which indicates that the user averaged 9,868 steps each day during week 15.

FIG. 2B also depicts a user interface that displays requested pedometer data to the user of the mobile device 100. For example, a graph 216 can display a visual depiction of the number of steps logged each day of the week for week 1, where the number of steps is expressed in a unit of one thousand steps. The user of the mobile device can select to have the requested data displayed on a daily 218 basis, such as several days at a time, on a weekly 220 basis, such as data for each week of a month, or on a monthly basis, such as data for each month of the year.

When the user is requesting the display of data requested for user interfaces such as the user interfaces depicted in FIG. 2A and FIG. 2B, the mobile device 100 may also need to update, process, and display the pedometer data in real time or near-real time. If the user is requesting the display of data for the current day or the current hour, the mobile device 100 needs to process and display the data in real time or near-real time so that the user can view additional steps as they are being taken while the user is in motion.

Embodiments of the present disclosure can include user interfaces that permit a user to enter pedometer goals and receive feedback on progress towards those goals. Other embodiments can be recognized by those of skill in the art.

Figure 3:
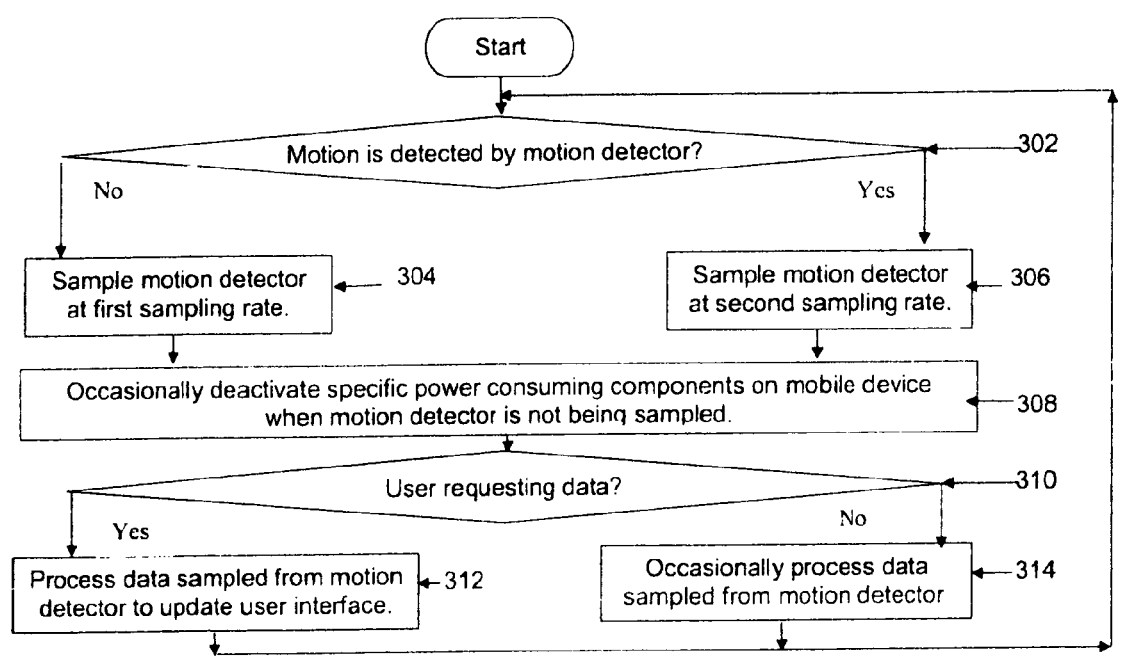
FIG. 3 is a flow chart of a method for a mobile device to detect motion according to an embodiment of the present disclosure.

Turning now to FIG. 3, a flowchart of a method for sampling to detect motion is depicted according to an embodiment of the present disclosure. In block 302, the pedometer application 102 determines whether motion is detected by the motion detector 106. For example, the pedometer application 102 determines whether data currently detected by the motion detector 106 is sufficiently different from the data most recently detected by the motion detector 106 to indicate that the user of the mobile device 100 has taken a step. If the pedometer application 102 determines that motion is not detected by the motion detector 106 for a specified period of time, such as one minute, the method continues to box 304. If the pedometer application 102 determines that motion is detected by the motion detector 106 during the specified period of time, the method proceeds to box 306.

In block 304, the pedometer application 102 samples the motion detector 106 at a first sampling rate when no motion has been detected for specified time. For example, the pedometer application 102 samples the motion detector 106 once every second if the mobile device 100 was motionless for a minute. As long as the data currently detected by the motion detector 106 is not sufficiently different from the data most recently detected, idle data and/or the data continues to indicate no significant movement, the pedometer application 102 continues to sample the motion detector only once every second. A rate of once every second is frequent enough to collect data when the user of the mobile device 100 begins walking or running, but infrequent enough as to not be a burden on the processing power for the mobile device 100 or to unnecessarily drain the battery 142. After block 304, the method proceeds to box 308.

In block 306, the pedometer application 102 samples the motion detector 106 at a second sampling rate when motion is detected within the specified period of time. The second sampling rate is more frequent than the first sampling rate. For example, at the second sampling rate the pedometer application 102 samples the motion detector 106 sixteen times each second. As long as walking or running movement continues to be detected by the motion detector, the pedometer application 102 continues to sample the motion detector sixteen times every second. A rate of sixteen times every second is frequent enough to accurately collect data when the user of the mobile device 100 is walking or running, but infrequent enough as to not be a significant burden on the processing power or the battery 142 for the mobile device 100. Although a rate of sixteen times every second is described as the high rate and one time every second is described as the low rate, other rates could be used. After block 306, the method proceeds to box 308.

In block 308, specific power consuming components, such as the processor and clocks, on the mobile device 100 may occasionally deactivate when the motion detector 106 is not being sampled. For example, the processor 138 and the main clock 140 on the mobile device 100 may deactivate when the motion detector 106 is not being sampled, provided that the user of the mobile device 100 is not actively using a system or an application on the mobile device 100 and the mobile device 100 is not engaged in communication or other activity. By deactivating the processor 138 and the main clock 140 on the mobile device 100 when the motion detector 106 is not being sampled, the battery 142 on the mobile device 100 can power the mobile device for a longer period of time without the need for recharging or replacing the battery 142.

In block 310, the processor 102 determines whether the user is interacting with the user interface application 116 to request pedometer data. If the processor 102 determines that the user is viewing or requesting pedometer data, such as via the display of a user interface depicted in FIG. 2A, the method proceeds to box 312. If the processor 102 determines that the user is not requesting pedometer data, the method proceeds to box 314.

In block 312, the processor 102 processes data sampled from the motion detector 106 to update a user interface. For example, the processor 102 processes data sampled from the motion detector 106 in real time or near-real time to update requested pedometer data for a user interface, such as the user interface depicted in FIG. 2A. If the user is requesting pedometer data, such as to the display of a user interface depicted in FIG. 2A, the processor 138 processes the pedometer data as soon as possible for display on the user interface. After block 312, the method returns to box 302.

When the user is not interacting with the user interface application 116, at block 314, the processor 102 occasionally processes data sampled from the motion detector 106 that is stored in the data library 110. For example, the processor 102 does not need to process data sampled from motion detector 106 in real time or near real time when the user of the mobile device 100 is not using or requesting pedometer data. Therefore, the pedometer data can be batch-processed on an occasional basis, such as once every 5 seconds more or less, to insure that the pedometer data is processed for future use. However, because the user is not currently requesting pedometer data, the processor 138 can either process other data or enter sleep mode to save power while waiting for the occasional batch-processing of pedometer data. After block 314, the method returns to box 302.

Although the present disclosure describes two modes of sampling the motion detector, the method can provide multiple modes of sampling data. For example, when motion data indicates no movement for one minute, the method can switch from a higher sampling rate to an intermediate sampling rate to reduce the possibility that any motion data is lost. If the motion data continues to indicate no movement for an additional period of time, the system could switch from the intermediate sampling rate to an even lower sampling rate, to further conserve battery and processing resources. Furthermore, one or more higher sampling rates could be used to increase accuracy. For example, a sampling rate of once a minute may be sufficient for accurately measuring steps during a fast walk, and the method can switch to an even higher sampling rate after detecting a fast walk, or 120 to 150 steps per minute, to more accurately measure steps during a run.

Figure 4:
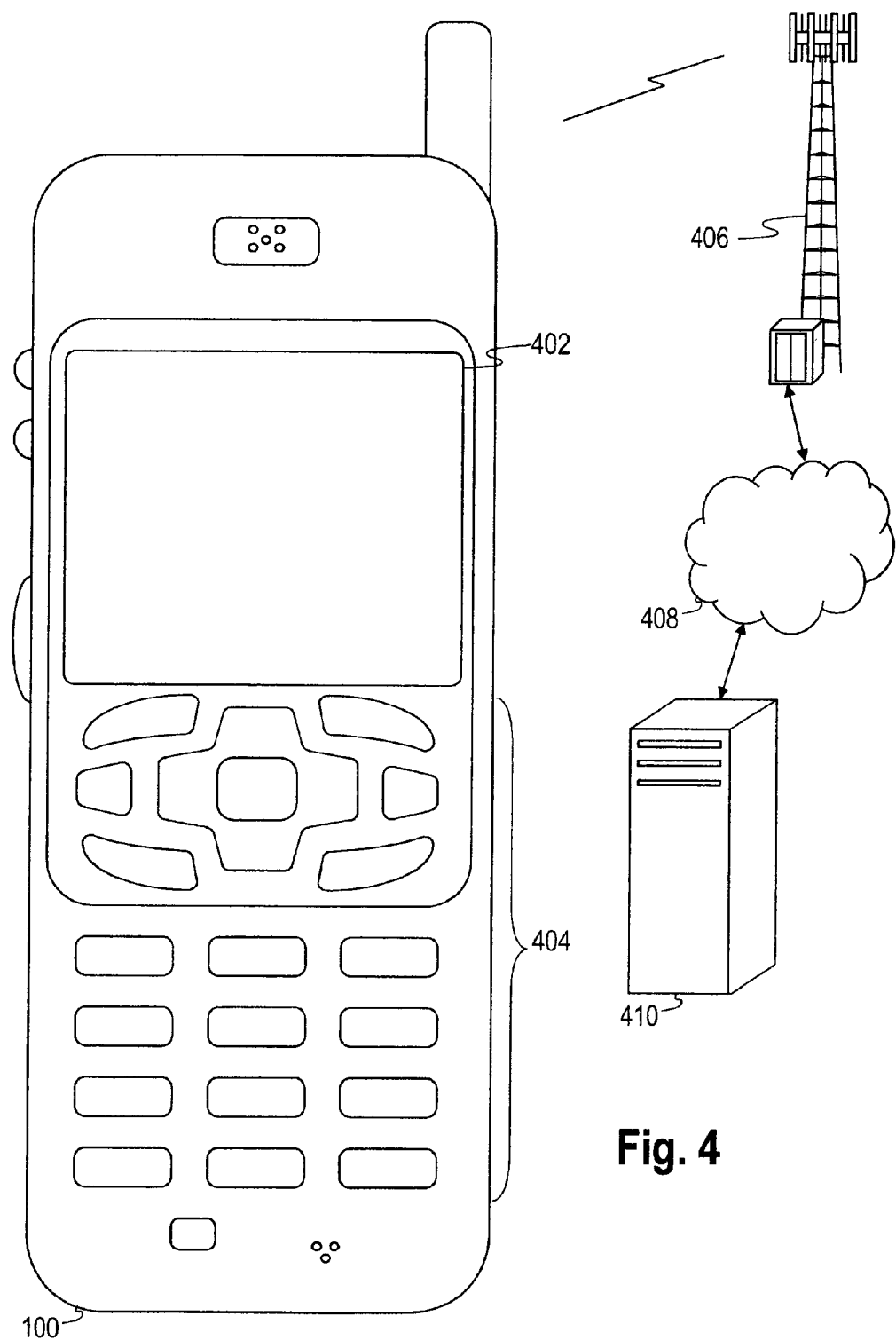
FIG. 4 is an illustration of wireless communications system.

FIG. 4 shows a wireless communications system including the mobile device 100. FIG. 4 depicts the mobile device 100, which is operable for implementing aspects of the present disclosure, but the present disclosure is not limited to these implementations. Though illustrated as a mobile phone, the mobile device 100 may take various forms including a wireless mobile device, a pager, a personal digital assistant (PDA), a portable computer, a tablet computer, a laptop computer, a digital camera, a digital music player, a digital calculator, and an electronic key fob for keyless entry. Many suitable mobile devices combine some or all of these functions. In some embodiments of the present disclosure, the mobile device 100 is not a general-purpose computing device like a notebook or tablet computer, but rather is a special-purpose communications device such as a mobile phone, pager, or PDA.

The mobile device 100 includes a display 402 and a touch-sensitive surface or keys 404 for input by a user. The mobile device 100 may present options for the user to select, controls for the user to actuate, and/or cursors or other indicators for the user to direct, including options such as requests for pedometer data displayed on a user interface. The mobile device 100 may further accept data entry from the user, including numbers to dial or various parameter values for configuring the operation of the mobile device. The mobile device 100 may further execute one or more software or firmware applications in response to user commands, such as the pedometer application 102. These applications may configure the mobile device 100 to perform various customized functions in response to user interaction.

Among the various applications executable by the mobile device 100 are a web browser, which enables the display 402 to show a web page. The web page is obtained via wireless communications with a cell tower 406, a wireless network access node, or another wireless communications network or system. The cell tower 406 (or wireless network access node) is coupled to a wired network 408, such as the Internet. Via the wireless link and the wired network, the mobile device 100 has access to information on various servers, such as a content server 410. The content server 410 may provide content that may be shown on the display 402.

Figure 5:
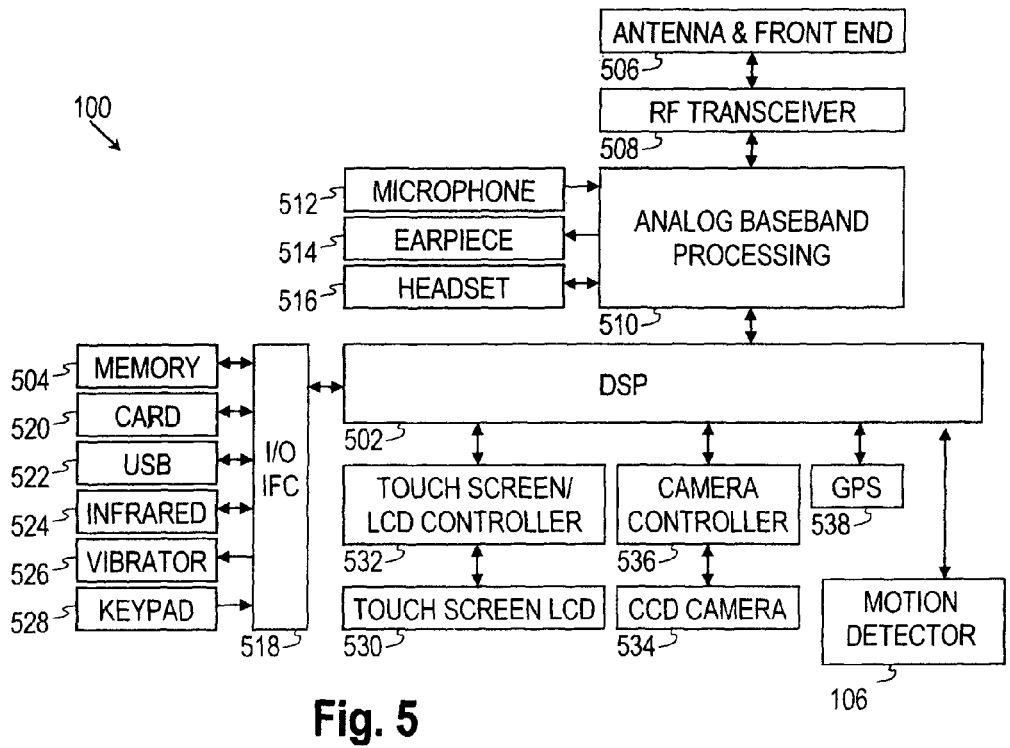
FIG. 5 shows a block diagram of an illustrative mobile device.

FIG. 5 shows a block diagram of the mobile device 100. The mobile device 100 includes a digital signal processor (DSP) 502 and a memory 504. The DSP 502 can be the same as the processor 138 while the memory 504 can include the non-volatile memory 132 and the database 114. As shown, the mobile device 100 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, a global positioning system (GPS) sensor 538, and the motion detector 106.

The DSP 502 or some other form of controller or central processing unit operates to control the various components of the mobile device 100 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 100 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 100 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the mobile device 100 to function as a peripheral device to exchange information with a personal computer or other computer system. The infrared port 524 and other optional ports such as a Bluetooth interface or an IEEE 802.11 compliant wireless interface may enable the mobile device 100 to communicate wirelessly with other nearby mobile devices and/or wireless base stations.

The input/output interface 518 may further connect the DSP 502 to the vibrator 526 that, when triggered, causes the mobile device 100 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 100, including information entered such as a request for pedometer data displayed on a user interface. Another input mechanism may be the touch screen LCD 530, which may also display text and/or graphics to the user. The touch screen LCD controller 532 couples the DSP 502 to the touch screen LCD 530.

The CCD camera 534 enables the mobile device 100 to take digital pictures. The DSP 502 communicates with the CCD camera 534 via the camera controller 536. The GPS sensor 538 is coupled to the DSP 502 to decode global positioning system signals, thereby enabling the mobile device 100 to determine its position. Various other peripherals may also be included to provide additional functions, e.g., radio and television reception.

Figure 6:
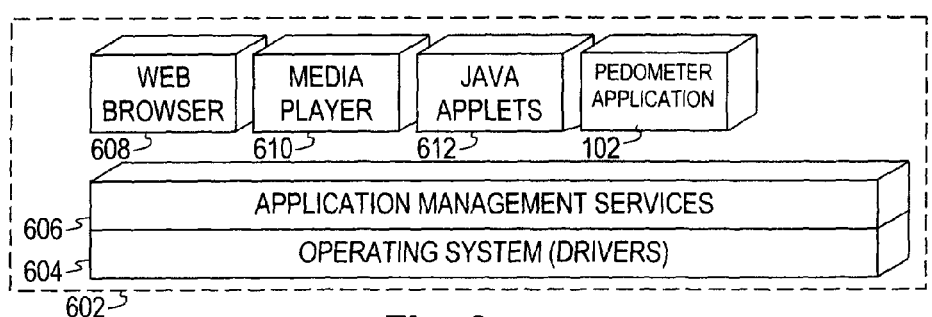
FIG. 6 shows a diagram of an illustrative software configuration for a mobile device.

FIG. 6 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile device 100. Also shown in FIG. 6 are a web browser application 608, a media player application 610, Java applets 612, and the pedometer application 102. The web browser application 608 configures the mobile device 100 to operate as a web browser, allowing a user to enter information into forms and select links to retrieve and view web pages. The media player application 610 configures the mobile device 100 to retrieve and play audio or audiovisual media. The Java applets 612 configure the mobile device 100 to provide games, utilities, and other functionality.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a mobile device;
    a user interface configured in the mobile device;
    a motion detector configured in the mobile device; and
    a pedometer application configured in the mobile device and configured to sample data from the motion detector at a first sampling rate when no motion is detected by the motion detector for a specified time and configured to sample data from the motion detector at a second sampling rate when motion is detected by the motion detector, wherein the second sampling rate is more frequent than the first sampling rate;
    wherein the pedometer application is further configured to process data from the motion detector in at a first processing rate when a user requests pedometer data from the user interface, and process data from the motion detector at a second processing rate when the user is not requesting pedometer data from the user interface, the first processing rate being faster than the second processing rate.

2. The apparatus of claim 1, further comprising power consuming components in the mobile device that occasionally deactivate when the pedometer application is not sampling for motion.

3. The apparatus of claim 2, wherein the power consuming components comprise at least one of a processor and a main clock.

4. The apparatus of claim 1, wherein the pedometer application in the mobile device is activate, based on at least one of a current user input and a stored pedometer status.

5. The apparatus of claim 1, wherein the mobile device is one of a mobile telecommunication device, a mobile handset, a personal digital assistant, a mobile computer, a handheld gaming device, a wireless mobile device, a pager, a portable computer, a tablet computer, a laptop computer, a digital camera, a digital music player, a digital calculator, and an electronic key fob for keyless entry.

6. The apparatus of claim 1, further comprising a processor to occasionally process data sampled from the motion detector.

7. The apparatus of claim 1, wherein the second sampling rate is determined by a timer based on a sleep clock.

8. The apparatus of claim 6, wherein the processed data includes data related to at least one of steps, miles, kilometers, calories.

9. The apparatus of claim 6, further comprising storing the processed data for a period of time that includes at least one of hours, days, weeks, months, and years.

10. A method for detecting motion, comprising:
   determining whether motion is detected by a motion detector configured in a mobile device;
   sampling data, using a pedometer application configured in the mobile device, from the motion detector at a first sampling rate when no motion is detected for a specified time;
   sampling data, using the pedometer application, from the motion detector at a second sampling rate when motion is detected, wherein the second sampling rate is more frequent than the first sampling rate; and
   processing data, using the pedometer application, from the motion detector at a first processing rate when a user requests pedometer data from a user interface and process data from the motion detector at a second processing rate when the user is not requesting pedometer data from the user interface, the first processing rate being faster than the second processing rate.

11. The method of claim 10, further comprising occasionally deactivating specific power consuming components in the mobile device when motion data is not being sampled.

12. The method of claim 11, wherein the specific power consuming components comprise at least one of a processor and a main clock.

13. The method of claim 10, further comprising processing data sampled from the motion detector to update a user interface.

14. The method of claim 10, further comprising occasionally processing data sampled from the motion detector.

15. An apparatus for detecting motion, comprising:
   a mobile device;
   a user interface configured in the mobile device;
   a processor configured in the mobile device;
   a motion detector configured in the mobile device and operable to detect motion; and
   an application configured in the mobile device and having instructions that, when executed by the processor, promote sampling the motion detector at a first sampling rate when no motion is detected for a specified time and further promote sampling the motion detector at a second sampling rate when motion is detected, wherein the second sampling rate is more frequent than the first sampling rate;
   wherein the pedometer application is further configured to process data from the motion detector in at a first processing rate when a user requests pedometer data from the user interface, and process data from the motion detector at a second processing rate when the user is not requesting pedometer data from the user interface, the first processing rate being faster than the second processing rate.

16. The apparatus of claim 15, wherein the application is further defined as a gaming application.

17. The apparatus of claim 15, wherein the mobile device comprises an antenna coupled to the processor and configured to convert wireless signals to electric signals and wherein the mobile device is one of a mobile telecommunication device, a mobile handset, a personal digital assistant, a mobile computer, a handheld gaming device, a wireless mobile device, a pager, a portable computer, a tablet computer, a laptop computer, a digital camera, a digital music player, a digital calculator, and an electronic key fob for keyless entry.

18. The apparatus of claim 15, wherein sampling motion detector is further defined as sampling data output by the motion detector.

19. The apparatus of claim 15, wherein the processor occasionally processes data sampled from the motion detector absent user interaction with a user interface related to the application, when the user interacts with the user interface, processing the motion data to the user interface in substantially real time.

20. The apparatus of claim 15, wherein the second sampling rate is determined by a timer based on a sleep clock.

21. An apparatus comprising:
   a mobile device;
   a user interface configured in the mobile device;
   a motion detector configured in the mobile device; and
   a pedometer application configured in the mobile device, the pedometer application configured to sample data from the motion detector to capture movement by a user of the mobile device by periodically sampling data from the motion detector;
   wherein the pedometer application is further configured to process data from the motion detector at a first processing rate when a user requests pedometer data from the user interface, and process data from the motion detector at a second processing rate when the user is not requesting pedometer data from the user interface, the first processing rate being faster than the second processing rate.

22. The apparatus of claim 21, further comprising:
   a user interface configured in the mobile device, the user interface operable to provide data or voice information to or receive data or voice information from the user; and
   a processor configured in the mobile device, the processor operable to control operation of the user interface, execute the pedometer application, and display information associated with the pedometer application on the user interface.

23. The apparatus of claim 21, wherein the mobile device is one of a mobile telecommunication device, a mobile handset, a personal digital assistant, a mobile computer, a handheld gaming device, a wireless mobile device, a pager, a portable computer, a tablet computer, a laptop computer, a digital camera, a digital music player, a digital calculator, and an electronic key fob for keyless entry.

* * * * *